United States Patent Office 3,322,285
Patented May 30, 1967

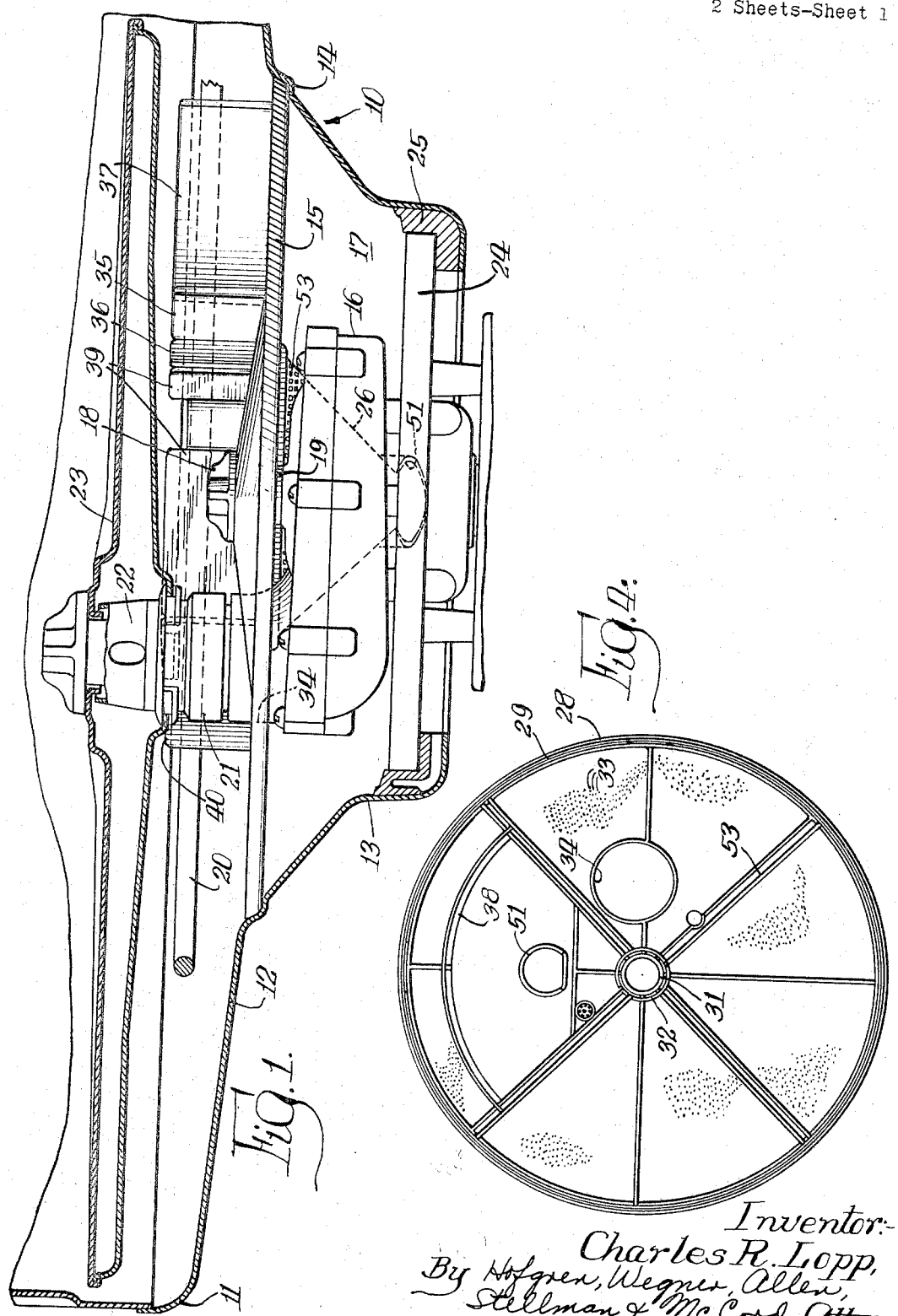

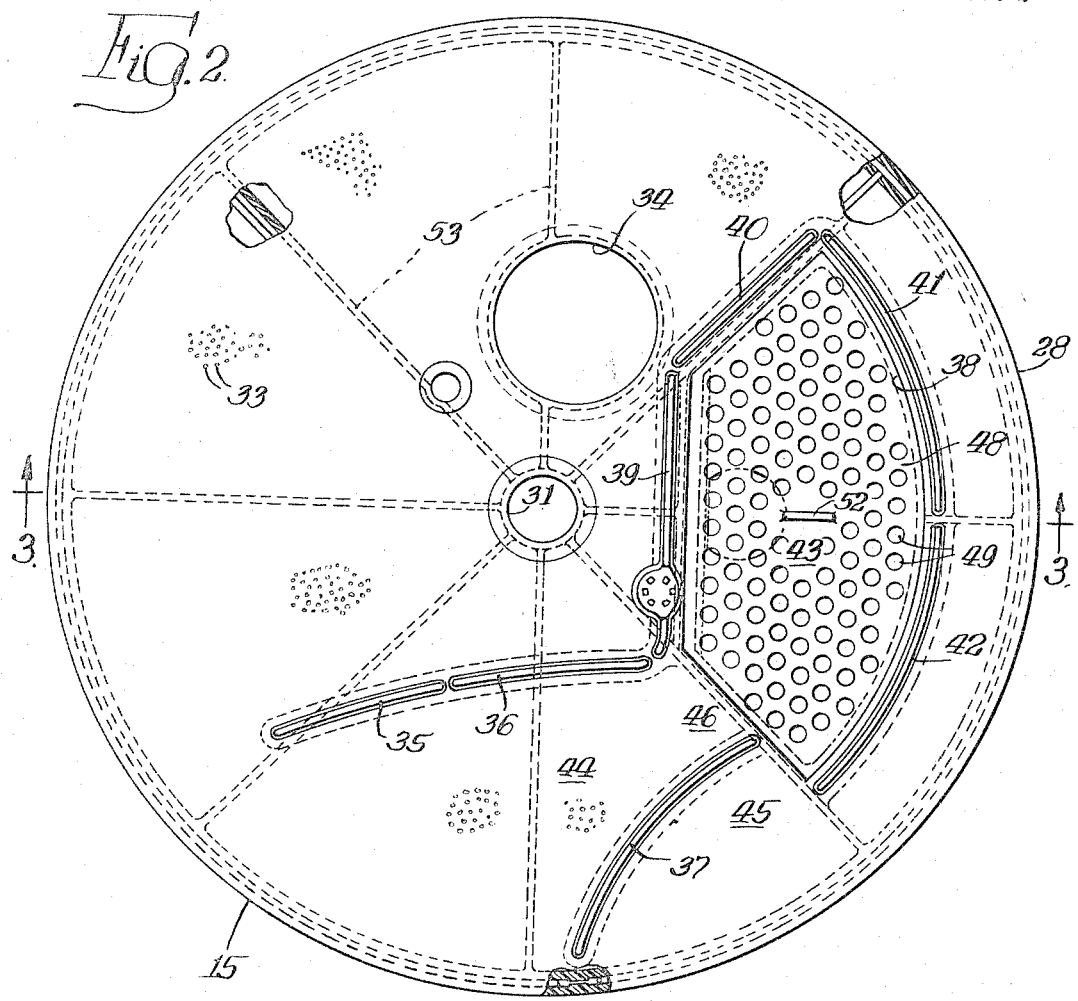
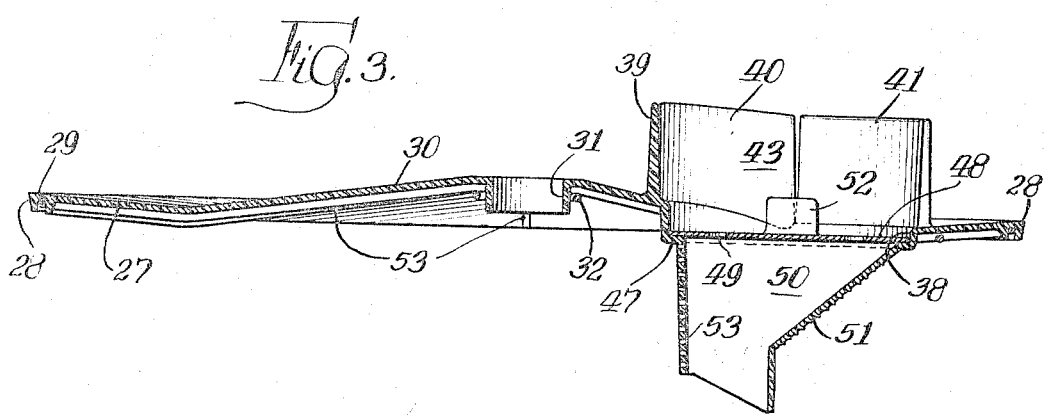

3,322,285
FILTER FOR WASHING APPARATUS
Charles R. Lopp, White Bear Lake, Minn., assignor to Whirlpool Corporation, a corporation of Delaware
Filed Jan. 5, 1965, Ser. No. 423,468
7 Claims. (Cl. 210—314)

This invention relates to washing apparatus and in particular to filter means for filtering selected matter from the washing liquid.

In one conventional form of dishwasher, means are provided defining a dishwashing chamber having a lower portion defining a sump for collecting the dishwashing liquid and delivering the liquid to a pump for recirculation in the washing operation. It is desirable in such a dishwashing apparatus to filter, from the washing liquid, particulate material and the like washed from the dishes before admitting the dishwashing liquid to the pump for the recirculation thereof. For this purpose, a filter is placed in the sump portion of the dishwasher to filter the undesirable particulate material from the liquid.

Further, in such dishwashing apparatus, a discharge outlet is provided through which the particulate material is ultimately flushed upon completion of the dishwashing cycle. Thus, it is desirable to direct the filter matter to the discharge outlet upon completion of the dishwashing operation to remove the matter with the spent dishwashing liquid.

The present invention comprehends an improved filter for use in such a dishwashing apparatus.

Thus, a principal feature of the present invention is the provision of a new and improved filter.

Another feature of the invention is the provision of such a filter for use in washing apparatus having new and improved means for filtering matter from the washing liquid and delivering it to a preselected discharge space.

A further feature of the invention is the provision of such a filter for use in washing apparatus for filtering from washing liquid matter larger than a preselected size and providing controlled delivery of the matter, the filter comprising, foraminous means having a first portion provided with openings having a size smaller than the preselected size, and a second portion provided with openings having a size larger than the preselected size, and guide means upstanding from the foraminous means for guiding washing liquid carrying the matter from over the first portion to over the second portion for directing the matter through the openings thereof.

A yet further feature of the invention is the provision of such a filter wherein the guide means are arranged to retain the liquid in overlying relationship to the second portion of the filter sufficiently to cause the relatively large size matter to pass downwardly therethrough and thereby prevent recirculation thereof in the washing cycle.

A further feature of the invention is the provision of such a filter wherein the second portion of the filter is removably carried by the first portion for facilitated cleaning thereof as desired.

Still another feature of the invention is the provision of such a filter having new and improved means for preventing the settling of the matter on the first portion of the filter, said means including means for maintaining a high velocity of liquid flow over the first portion of the filter.

Other features and advantages of the invention will be apparent from the following description taken in connection with the accompanying drawing wherein:

FIGURE 1 is a fragmentary diametric vertical section of a dishwashing apparatus provided with a filter embodying the invention;

FIGURE 2 is a top plan view of the filter with portions thereof broken away to facilitate the illustration thereof;

FIGURE 3 is a diametric section thereof taken substantially along the line 3—3 of FIGURE 2; and FIGURE 4 is a reduced, bottom plan view of the filter.

In the exemplary embodiment of the invention as disclosed in the drawing, a washing apparatus, herein a dishwasher, generally designated 10 is shown to comprise a tub 11 having a bottom wall 12 defining a central, depending sump portion 13. At the upper end of the sump portion 13, the wall 12 defines an annular shoulder 14 removably carrying a filter screen 15. A motor driven pump 16 is disposed in the sump space 17 below the filter screen 15 and a nut 18 is threadedly connected to an upstanding boss 19 on the pump 16 for retaining the filter screen 15 in place on the annular shoulder 14.

The dishwasher apparatus 10 may further include a conventional electric heater 20 disposed slightly above the bottom wall 11 such as for use in drying the dishes in the apparatus 10. The pump 16 includes an outlet 21 connected to a hollow hub 22 of a conventional spray arm 23 which is rotatable in the tub 11 to throw the washing liquid upwardly against dishes and the like (not shown) normally disposed within the tub 11 above the dishwasher arm.

Thus, in the normal washing cycle, the washing liquid is pumped through the spray arm 23 against the objects to be washed in the tub 11 from which it falls downwardly through the filter screen 15 into the sump space 17 to be recirculated by the pump 16. The lower end of the sump 17 is closed by a plate 24 sealed to the sump wall 13 by a gasket 25. Extending downwardly from the filter screen 15 is a depending drain guide 26 which is connected to the drain (not shown) for conducting the washing liquid and filtered matter to the drain upon completion of the washing cycle.

Referring now more specifically to FIGURES 2, 3 and 4, the filter screen 15 is shown to comprise a generally circular foraminous member which is generally flat, as shown in FIGURE 3, and provided with a plurality of upstanding walls for guiding the washing liquid during the washing operation in a preselected movement over the surface of the filter screen. More specifically, the filter 15 includes a slightly inclined frusto-conical outer annular portion 27 provided with a peripheral flange 28 carrying a reinforcing wire 29. The mid-portion of the filter 15 is defined by an upwardly inclined frusto-conical portion 30 and a tubular wall 31 at its central axis for receiving the boss 19, as shown in FIGURE 1. The tubular flange 31 is reinforced by a suitable wire 32, as shown in FIGURE 3.

Each of portions 27 and 30 is foraminous, being provided with a plurality of relatively small size openings 33 having a size smaller than the preselected size of the matter to be filtered so that in normal operation of the washing apparatus matter such as food particles and the like having a size larger than the holes 33 is prevented from passing back down into the sump space 17 for recirculation by the pump 16.

The filter portions 27 and 30 may be further reinforced by radially extending ribs 53. An opening 34 is provided in the mid-portion 30 of the filter through which the pump outlet 21 extends to deliver the washing liquid to the spray arm 23, as shown in FIGURE 1.

As discussed briefly above, a plurality of upstanding walls are provided on the filter 15 for guiding the washing liquid over the upper surface of the filter during the normal washing cycle. In the illustrated embodiment, the walls comprise first guide walls 35 and 36 and second guide wall 37. The mid-portion 30 of the filter is provided with a large drain opening 38 spaced radially inwardly from the peripheral portion 28 thereof. Extending along the opening 38 are four retaining walls 39, 40, 41 and 42 which cooperatively define a space 43 overlying the opening 38. Walls 35 and 36 cooperate with wall 37 to define a first channel 44 leading to space 43 and wall 37 defines a side wall of a second channel 45, also leading to space 43. The retaining walls 39 and 42 are spaced apart at one end of the space 43 to define an inlet 46 providing communication between channels 44 and 45 and space 43.

Filter portion 30 further defines an annular shoulder 47 subjacent opening 38 on which rests a drain screen 48. As best seen in FIGURE 2, the screen 48 is provided with a plurality of relatively large diameter openings 49 permitting the matter carried in the washing liquid and delivered to space 43 to pass downwardly through the screen and into a subjacent drain space 50 defined by a depending tubular wall 51 comprising a downward extension of the filter portion 30. As seen in FIGURES 2 and 3, the screen 48 is provided with an upstanding wall 52 which extends generally transversely to the direction of flow of liquid into space 43 from inlet 46 to serve as a deflector for baffling the incoming liquid stream in space 43, and also to provide for finger-tip manipulation of the screen 48 as during removal thereof from the filter member 15 when desired.

As best seen in FIGURE 3, the depending wall 51 is provided with a plurality of small openings 53 of relatively small size precluding the passage of the matter collected in space 50 outwardly through the wall 51 and back into the sump space 17.

The walls 35, 36, 37, 39, 40, 41 and 42 upstand substantially above the flat upper surface of the filter 15, as best seen in FIGURES 1 and 3. Thus, the walls provide a positive liquid guiding action during the liquid flow over the filter surface. The walls 39, 40, 41 and 42 surrounding the drain opening 38 effectively preclude the return of the washing liquid thereover onto the surrounding filter surface and assure the delivery of the matter to be filtered from the liquid into the drain space 50. To prevent clogging of the relatively small openings 33 by the matter carried by the washing liquid as it enters inlet 46 of space 43, the walls 35, 36 and 37 are arranged to constrict the channels 44 and 45 so as to increase the velocity of the liquid flow therethrough and thereby maintain the matter to be filtered in suspension in the liquid until it reaches the space 43. The matter then readily passes downwardly through the relatively large openings 49 in the screen 48 to be trapped on the wall 51 by virtue of the small size of the openings 53 therein which permits the liquid to pass back into sump space 17 but prevents the particular matter from passing with the liquid thereto.

Thus, in the normal washing cycle, the washing liquid is constantly flowed over the upper surface of filter portions 27 and 30, through the channels 44 and 45 and inlet 46 into the space 43 from which the liquid and the suspended matter pass downwardly through the openings 49 to the drain space 50. The movement of the liquid over the filter constantly washes the upper surface thereof to maintain this surface relatively clean, and causes the constant delivery of the matter to be filtered to the drain space 50.

Upon completion of the washing cycle, the drain cycle is initiated to cause the liquid in sump 17 to pass in a reverse direction through the openings 53 of wall 51 and thereby wash the matter from the wall 51 downwardly with the draining liquid into the drain (not shown). Thus, the automatic flushing operation provides a self-cleaning functioning of the filter 15 during each drain cycle effectively eliminating the need for cleaning maintenance of the filter.

Should for any reason it be desired to remove the entire filter 15, this may be readily effected by removing the nut 18 and raising the filter from the shoulder 14 of the tub bottom wall 12. Similarly, if for any reason it is desired to remove the filter screen 48, this may be readily effected simply by the user grasping the wall portion 52 and raising the screen upwardly from the shoulder 47. In normal use, however, the self-cleaning action of the filter 15 effectively eliminates the need for removal thereof from the tub 11.

The filter 15 may be formed of a sanitary material such as a plastic permitting the filter to be economically produced such as by molding. The reinforcing wires may be formed of stainless steel for effectively minimizing maintenance thereof.

While I have shown and described one embodiment of my invention, it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. In a washing apparatus having foraminous means for filtering from washing liquid matter larger than a preselected size and providing controlled delivery of said matter, said foraminous means having a first portion provided with openings having a size smaller than said preselected size, and a second portion provided with openings having a size larger than said preselected size, the improvement comprising upstanding wall means carried by said foraminous means and extending across at least a portion of said foraminous means for guiding a major portion of the washing liquid carrying said matter from over said first portion indirectly to over said second portion and a minor portion of the washing liquid carrying said matter from said first portion directly to over said second portion for directing said matter through the openings of said second portion.

2. The filter of claim 1 wherein said wall means defines a channel having varying cross-section for varying the velocity of liquid flow therethrough.

3. The filter of claim 1 wherein said wall means defines a channel having varying cross-section for varying the velocity of liquid flow therethrough to have a maximum flow velocity adjacent said second portion.

4. The filter of claim 1 wherein said foraminous means comprises a generally flat circular member, said second portion is spaced inwardly of the periphery thereof, and said wall means includes a portion extending about said second portion whereby said first portion may carry said washing liquid from circumjacent substantially the entire periphery of said second portion indirectly to said second portion.

5. The filter of claim 1 further including a wall upstanding from said second portion and extending transversely to the direction of flow of said liquid from said wall means to over said second portion for impeding the flow of liquid across said second portion.

6. The filter of claim 5 wherein said wall comprises a handle for fingertip engagement in removing the second portion from association with said first portion.

7. The filter of claim 1 wherein said wall means is arranged to guide a substantial portion of the washing liquid away from said second portion prior to guiding it to over said second portion.

References Cited
UNITED STATES PATENTS 2,681,658  6/1954  Meeker et al. _____ 134—111
2,862,510  12/1958  Geiger et al. _____ 134—111

REUBEN FRIEDMAN, *Primary Examiner.*

W. S. BRADBURY, *Assistant Examiner.*